(12) United States Patent
Kocur et al.

(10) Patent No.: US 9,688,149 B2
(45) Date of Patent: Jun. 27, 2017

(54) VOLTAGE STABILIZATION APPARATUS

(75) Inventors: Vit Kocur, Tschechische (CZ); Martin Gerhat, Tschechische (CZ)

(73) Assignee: Flextronics International Kft., Zalaegerszeg (HU)

( * ) Notice: Subject to any disclaimer, the term of this patent is extended or adjusted under 35 U.S.C. 154(b) by 968 days.

(21) Appl. No.: 14/000,130

(22) PCT Filed: Feb. 20, 2012

(86) PCT No.: PCT/EP2012/052874
§ 371 (c)(1),
(2), (4) Date: Oct. 28, 2013

(87) PCT Pub. No.: WO2012/113758
PCT Pub. Date: Aug. 30, 2012

(65) Prior Publication Data
US 2014/0042804 A1    Feb. 13, 2014

(30) Foreign Application Priority Data
Feb. 22, 2011 (EP) .................................... 11155402

(51) Int. Cl.
*B60R 16/03* (2006.01)
*H02J 7/34* (2006.01)
*B60L 1/00* (2006.01)
*H02M 1/00* (2006.01)

(52) U.S. Cl.
CPC ............... *B60L 1/00* (2013.01); *H02J 7/345* (2013.01); *H02M 2001/0093* (2013.01)

(58) Field of Classification Search
CPC .......................... B60L 1/00; H02M 2001/0093
See application file for complete search history.

(56) References Cited

U.S. PATENT DOCUMENTS

| 2006/0133007 | A1* | 6/2006 | Shiue | H02P 7/04 |
| | | | | 361/301.2 |
| 2009/0314561 | A1* | 12/2009 | Handa | F02N 11/0866 |
| | | | | 180/65.25 |
| 2010/0156180 | A1* | 6/2010 | Nishiyama | H02J 7/345 |
| | | | | 307/46 |

FOREIGN PATENT DOCUMENTS

DE          10333001 A1 *  2/2005  ............. B60R 16/03

* cited by examiner

*Primary Examiner* — Jared Fureman
*Assistant Examiner* — Joel Barnett
(74) *Attorney, Agent, or Firm* — Haverstock & Owens LLP

(57) ABSTRACT

A voltage stabilization apparatus (1) for a motor vehicle electrical system to stabilize at least one voltage-sensitive consumer (9) is proposed. The voltage stabilization apparatus is distinguished by a DC/DC converter circuit (3), an energy storage device (5) and a changeover switch (7), which are designed and arranged so that the energy storage device (5) is changeable by the DC/DC converter circuit (3) and the changeover switch (7) enables an electrical connection between the voltage-sensitive consumer (9) and the energy storage device (5) in such a way that the energy storage device (5) in case of need supplies a stabilization voltage ($U_{STAB}$) at the consumer (9).

20 Claims, 2 Drawing Sheets

VOLTAGE STABILIZATION APPARATUS

CROSS-REFERENCE TO RELATED APPLICATIONS

This application claims priority to PCT/EP2012/052874, filed Feb. 20, 2012 and entitled "Voltage Stabilization Apparatus," which claims priority to EP11155402, filed Feb. 22, 2011 and entitled "Spannungsstabilisierungseinrichtung," both of which are hereby incorporated by reference in their entirety as if set forth herein.

FIELD OF THE INVENTION

The invention relates to a voltage stabilization apparatus for a motor vehicle electrical system for stabilizing a voltage-sensitive consumer.

BACKGROUND OF THE INVENTION

Voltage stabilization apparatuses of the type addressed here are employed in particular for voltage stabilization in start-stop systems. The operating principle of start-stop systems is described frequently in the related art, so it will not be examined in greater detail here. A phenomenon of a normal starting process is the high power that the starter requires. That can cause the voltage in the vehicle electrical system to drop from the usual 12 V to as low as 6 V when starting the engine. When the engine restarts after stopping, a restart of audio and navigation systems, for example, typically occurs due to the sudden voltage drop. Such a voltage drop is unacceptable especially in the case of start-stop systems that are particularly intended to guarantee silent stopping and starting of the engine, unnoticed by the occupants of a motor vehicle.

SUMMARY OF THE INVENTION

In order to avoid the named problems during the starting process, in known start-stop systems of motor vehicles, a DC/DC step-up converter, also known as a boost converter, bridgeable by a switch arrangement, is provided, which takes over the control of the current during the starting process and supplies a greater output voltage than the input voltage at a voltage-sensitive consumer. In the case of a starting process, a flow of current thus takes place from the vehicle battery exclusively through the DC/DC step-up converter, which thereupon stabilizes the voltage, at least for parts of the vehicle electrical system. When the starting process is ended, the switches are closed, so that current is carried via the switch arrangement and the DC/DC-step-up converter is released. A disadvantage of the known voltage stabilization apparatuses is that high costs are incurred through the use of DC/DC step-up converter units.

The object of the present invention is therefore to create a voltage stabilization apparatus that can be produced more economically while having the same effectiveness.

To fulfill the above-named object, a voltage stabilization apparatus having the features of claim 1 is proposed. The voltage stabilization apparatus for a motor vehicle electrical system serves to stabilize at least one voltage-sensitive consumer, and is distinguished by the fact that a DC/DC-converter circuit, an energy storage device and a changeover switch are provided which are designed and arranged so that the energy storage device is chargeable by the DC/DC converter circuit and the changeover switch enables an electrical connection between the at least one voltage-sensitive consumer and the energy storage device, in such a way that the energy storage device supplies a stabilization voltage at the consumer when needed.

An essential point of the invention thus consists in the fact that instead of a rerouting of the battery current through a step-up converter in the case of a voltage drop caused in particular by a starting process, a stabilization voltage is supplied by an additional energy source, which can be recharged simply during a "normal operation" of the motor vehicle electrical system (hereinafter called the "vehicle electrical system") by the DC/DC converter circuit. "Normal operation" is understood here to mean operation of the vehicle electrical system without a voltage drop, thus normally the state of the vehicle electrical system before and after a starting process of the motor vehicle. All-in-all, the present invention results in significant advantages compared to the known voltage stabilization apparatuses. For example, for the voltage stabilization apparatus according to the present invention, only a much lower power of the DC/DC converter circuit is needed, namely to charge the energy storage device. As a result, the DC/DC converter circuit, and hence the entire voltage stabilization apparatus as a whole, can have smaller dimensions and in addition it can be produced more economically. An additional advantage consists in the improved EMC properties (EMC=electromagnetic compatibility).

The energy storage device is preferably a capacitor, in particular a double-layer capacitor, which is also referred to as a supercapacitor or supercap. The double-layer capacitor can be designed in particular as a pseudocapacitor. It is entirely conceivable, however, to employ a battery instead of a capacitor as the energy storage device. The DC/DC converter circuit and the energy storage device are preferably connected in parallel, so that in normal operation of the vehicle electrical system, the energy storage device can be charged by the DC/DC converter circuit, while an operating voltage is supplied at the at least one voltage-sensitive consumer exclusively by an energy source, and in particular by the vehicle battery. The changeover switch can be a relay. In principle, other types of switches can also be employed, however. The changeover switch is preferably arranged so that it is switchable in such a way that exclusively the operating voltage produced by the energy source is present at the consumer during the normal operation of the vehicle electrical system, and that in addition the stabilization voltage of the energy storage device is supplied at the consumer in the case of a voltage drop in the vehicle electrical system. Finally, a control device is preferably also provided to control the charging of the energy storage device and to control the time of switching of the changeover switch. The control device preferably includes a microcontroller, and provides for switching of the changeover switch at the right instant, and also provides for the energy source to be charged with a desired or appropriate voltage by the DC/DC converter. In addition, the control device can fulfill diagnostic functions, so that, for example, a malfunction of the voltage stabilization apparatus can be detected and appropriate countermeasures introduced.

BRIEF DESCRIPTION OF THE DRAWINGS

The invention will be explained in further detail below on the basis of the drawings. The figures show the following.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein can be applied to other embodiments. Thus, the present invention is not intended to be limited to the embodiment shown, but is to be accorded the widest scope consistent with the principles and features described herein.

Figure 1:
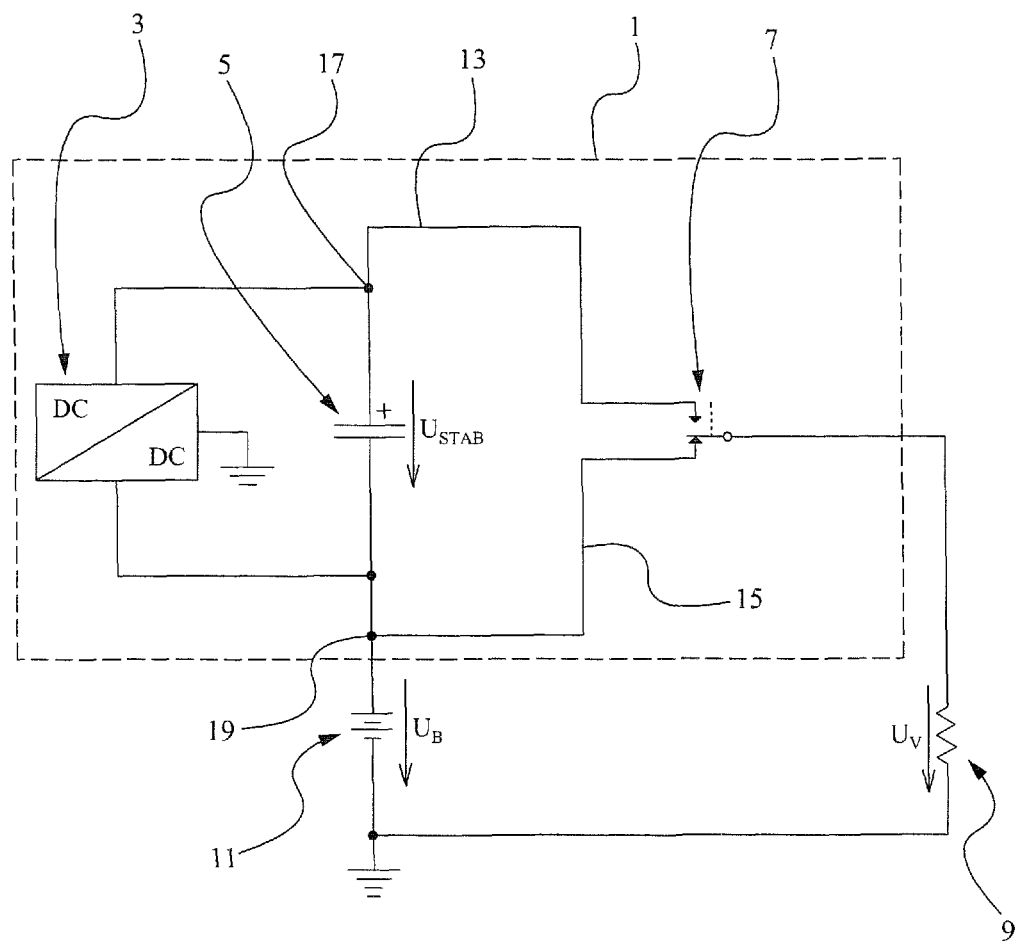
FIG. 1 is a circuit diagram of the voltage stabilization apparatus according to some embodiments of the present invention.

FIG. 1 shows a circuit diagram of a voltage stabilization apparatus 1 according to some embodiments of the invention. The voltage stabilization apparatus 1 includes a DC/DC converter circuit 3, an energy storage device 5 and a changeover switch 7, the DC/DC converter circuit 3 and the energy storage device 5 being connected in parallel. The voltage stabilization apparatus 1 serves to supply a stabilization voltage $U_{STAB}$ in the case of a voltage drop at least one voltage-sensitive consumer 9. A voltage-sensitive consumer is understood here to mean a consumer that can quit suddenly in the event of a voltage drop, such as, for example, entertainment or infotainment devices (e.g., car radio and other comfort control devices). Failure of such devices is not acceptable, and is prevented according to the present invention by supplying a stabilization voltage.

An energy source 11 supplies an operating voltage $U_B$ at the voltage-sensitive consumer 9, the energy source 11 usually being a battery, in particular the vehicle battery.

Changeover switch 7 is preferably designed as a relay, and enables the energy-storage device 5 to be connected to or disconnected from the consumer 9. Purely as an example, in FIG. 1 reference is made to a single consumer, although a plurality of consumers can be stabilized by the voltage stabilization apparatus 1. The changeover switch 7 can assume two switching states, where in the first switching state 13 it produces a serial connection between the consumer 9 and the energy storage device 5, such that a closed electrical circuit results between the consumer 9, the energy storage device 5 and the energy source 11. In this switching state, both the operating voltage $U_B$ and the stabilization voltage $U_{STAB}$ are present at the consumer. The second switching state 15 of the changeover switch 7 bypasses the energy storage device 5 and consequently produces a direct serial connection with the energy source 11. In this switching state, consequently, only the operating voltage $U_B$ is present at the consumer. The two switching states 13 and 15 are depicted in FIG. 1 schematically by means of connecting lines, which are intended to clarify the alternative switching states.

The changeover between the two switching states 13 and 15 is preferably controlled by a control device, not shown in the figure, which controls a switching instant at a particular time depending on the conditions of the vehicle electrical system.

Figure 2:
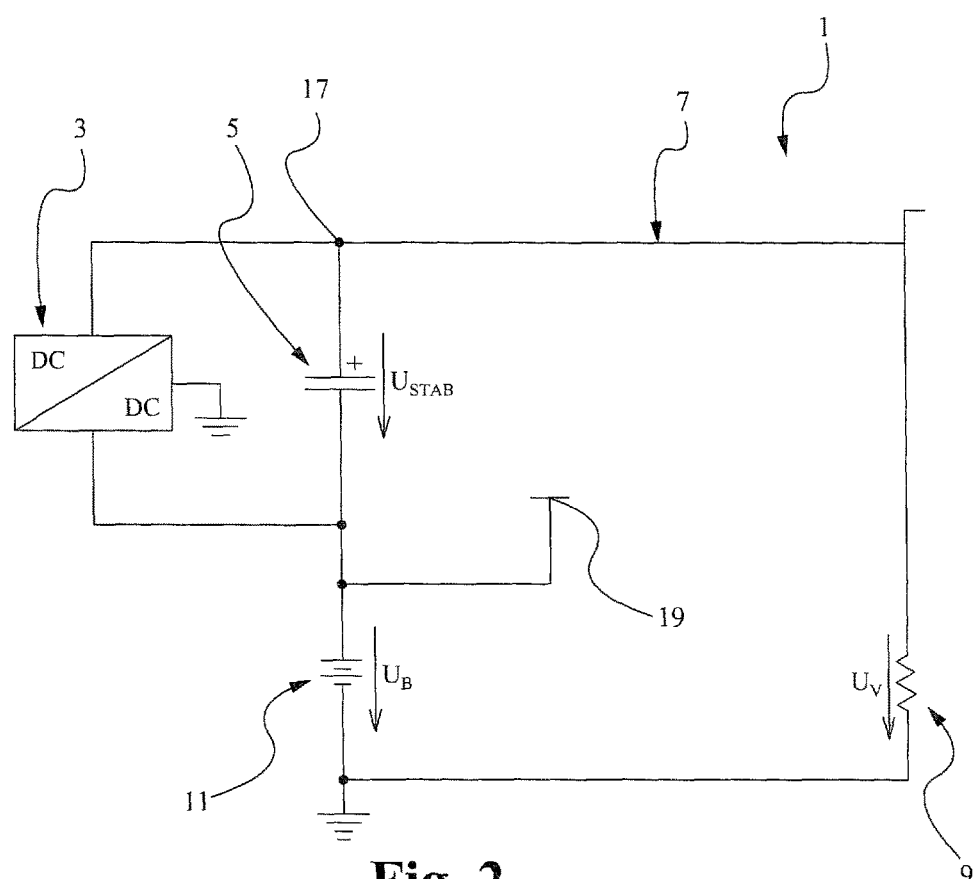
FIG. 2 is a circuit diagram of the voltage stabilization apparatus in a first operating state according to some embodiments of the present invention.

The operating principle of the voltage stabilization apparatus 1 will be explained below on the basis of FIG. 2 and FIG. 3. FIG. 2 shows a circuit diagram of the voltage stabilization apparatus 1 in a first operating state.

The first operating state is introduced by the control device mentioned above during a voltage fluctuation or voltage drop, in particular due to a starting process of the motor vehicle. In this case, the changeover switch 7 switches the energy storage device 5 into the current circuit by producing a serial connection between the consumer 9 and a connecting point 17 which lies between the DC/DC converter circuit 3 and the positive pole of the energy storage device 5, while the other connecting point 19 of the energy source 11 is free. This ensures that the voltage $U_V$ at the consumer does not drop, but rather is stabilized by the energy storage device 5. The stabilization voltage $U_{STAB}$ thus, as it were, balances out the voltage drop at the consumer 9.

FIG. 2 makes it clear that, in the first operating state of the voltage stabilization apparatus 1, the current flows from the energy source 11 through the energy storage device 5 into the stabilizing load, i.e., into the consumer 9. In this way, the reduced operating voltage $U_B$ is elevated by the stabilization voltage $U_{STAB}$ of the energy storage device 5, the magnitude of the stabilization voltage $U_{STAB}$ being "adjustable" by the control device during the charging process.

Figure 3:
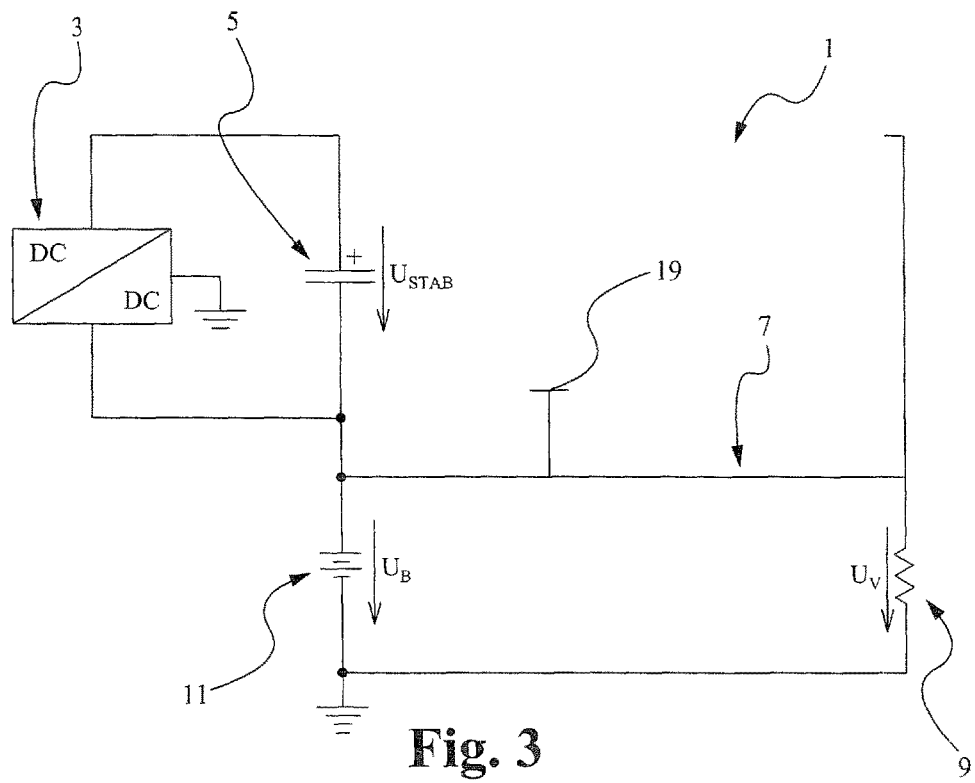
FIG. 3 is a circuit diagram of the voltage stabilization apparatus in a second operating state according to some embodiments of the present invention.

FIG. 3 shows a circuit diagram of the voltage stabilization apparatus 1 in a second operating state.

The second operating state is introduced by the control device when a voltage drop has not yet occurred or is already over, i.e., in particular before or after a starting process of the motor vehicle during "normal operation." In this case, the changeover switch 7 produces a connection between the connecting point 19 of the energy source 11 and the consumer 9, so that the consumer 9 is thus directly connected to the energy source 11 and the energy storage device 5 is switched off, so to speak. The current then flows from the energy source 11 directly to the consumer 9, instead of through the energy storage device 5. As a result, only the operating voltage $U_B$ is present at the consumer (that is, essentially $U_V = U_B$).

In the second operating state according to FIG. 3, the energy storage device 5 is charged by the DC/DC converter circuit 3 from the energy source 11, the charging process preferably being controlled by the control device, which usually has a microcontroller. The control device preferably monitors the charge state of the energy storage device 5, and can prescribe a maximum charging voltage.

All-in-all, it can be seen that through the use of an energy storage device 5, which in case of need can reliably supply at least one voltage-sensitive consumer 9 with a stabilization voltage, and which in addition is rechargeable by an energy source 11 through a DC/DC converter circuit 3, it is possible to use a smaller DC/DC converter circuit, whereby the need for constructed space and the costs of the voltage stabilization apparatus 1 according to the invention are reduced.

REFERENCE LABELS:

1 voltage stabilization apparatus
3 DC/DC converter circuit
5 energy storage device
7 changeover switch
9 voltage-sensitive consumer
11 energy source
13 first switching state
15 second switching state
17 connecting point
19 connecting point
$U_{STAB}$ stabilization voltage
$U_B$ operating voltage
$U_V$ consumer voltage The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications can be made in the embodiment chosen for illustration without departing from the spirit and scope of the invention as defined by the claims.

What is claimed is:

1. A voltage stabilization apparatus (1) for a motor vehicle electrical system for stabilizing at least one voltage-sensitive consumer (9), comprising:
    an energy source (11) for powering the motor vehicle electrical system;
    a DC/DC converter circuit (3) electrically coupled with the energy source (11);
    an energy storage device (5) electrically coupled in series with the energy source (11); and
    a changeover switch (7) that in a first state electrically couples the at least one voltage-sensitive consumer (9) to the energy source (11) and electrically decouples the at least one voltage sensitive consumer (9) from the DC/DC converter circuit (3) and the energy storage device (5), and in a second state where the voltage provided by the energy source (11) drops electrically couples the at least one voltage sensitive consumer (9) to both the DC/DC converter circuit (3) and the energy storage device (5) such that both the energy storage device (5) and the energy source (11) provide power to the at least one voltage-sensitive consumer (9) in the second state.

2. The voltage stabilization apparatus according to claim 1, characterized in that:
    the energy storage device (5) is a capacitor.

3. The voltage stabilization apparatus according to claim 2, characterized in that:
    the capacitor is a double layer capacitor.

4. The voltage stabilization apparatus according to claim 2, characterized in that:
    the DC/DC converter circuit (3) and the energy storage device (5) are connected in parallel.

5. The voltage stabilization apparatus according to claim 1, characterized in that:
    the DC/DC converter circuit (3) and the energy storage device (5) are connected in parallel.

6. The voltage stabilization apparatus according to claim 1, characterized in that:
    in normal operation of the motor vehicle electrical system, an operating voltage ($U_B$) is supplied at the at least one voltage-sensitive consumer (9) exclusively by the energy source (11).

7. The voltage stabilization apparatus according to claim 1, characterized in that:
    the changeover switch (7) is designed as a relay.

8. The voltage stabilization apparatus according to claim 1, characterized in that:
    the changeover switch (7) is arranged so that it is switchable in such a way that, during normal operation of the motor vehicle electrical system, exclusively the operating voltage ($U_B$) produced by the energy source (11) is present at the at least one voltage-sensitive consumer (9), and that in the case of a voltage drop in the motor vehicle electrical system, in addition the stabilization voltage ($U_{STAB}$) of the energy storage device (5) is supplied at the at least one voltage-sensitive consumer (9).

9. The voltage stabilization apparatus according to claim 1, characterized in that:
    the energy storage device (5) is chargeable exclusively during normal operation of the motor vehicle electrical system by the DC/DC converter circuit (3).

10. The voltage stabilization apparatus according to claim 1, characterized in that:
    a control device is provided to control the charging of the energy storage device (5) and to control the instant of switching of the changeover switch (7).

11. A method of providing voltage stabilization to at least one voltage-sensitive consumer (9) of a motor vehicle electrical system including an energy source (11) for powering the motor vehicle electrical system, a DC/DC converter circuit (3) electrically coupled with the energy source (11), an energy storage device (5) electrically coupled in series with the energy source (11), and a changeover switch (7), the method comprising:
    with the switch (7), electrically coupling the at least one voltage-sensitive consumer (9) to the energy source (11) and electrically decoupling the at least one voltage sensitive consumer (9) from the DC/DC converter circuit (3) and the energy storage device (5) thereby supplying an operating voltage ($U_B$) to the at least one voltage-sensitive consumer (9) with the energy source (11);
    upon detection of a voltage drop in the operating voltage ($U_B$) supplied to the at least one voltage-sensitive consumer (9), with the switch (7), electrically coupling the at least one voltage sensitive consumer (9) to both the DC/DC converter circuit (3) and the energy storage device (5) such that both the energy storage device (5) and the energy source (11) provide power to the at least one voltage-sensitive consumer (9) thereby supplying a stabilization voltage ($U_{STAB}$) to the at least one voltage-sensitive consumer (9); and
    charging the energy storage device (5) with a DC/DC converter circuit (3) when the voltage drop is no longer detected.

12. The method according to claim 11, wherein the energy storage device (5) is a capacitor.

13. The method according to claim 12, wherein the capacitor is a double layer capacitor.

14. The method according to claim 12, wherein the DC/DC converter circuit (3) and the energy storage device (5) are connected in parallel.

15. The method according to claim 11, wherein the DC/DC converter circuit (3) and the energy storage device (5) are connected in parallel.

16. The method according to claim 11, wherein when the voltage drop is not detected, the operating voltage ($U_B$) is supplied at the at least one voltage-sensitive consumer (9) exclusively by the energy source (11).

17. The method according to claim 11, wherein the changeover switch (7) is designed as a relay.

18. The method according to claim 11, wherein when the voltage drop is not detected, the changeover switch (7) is opened such that the energy storage device (5) is electrically decoupled from the at least one voltage-sensitive consumer (9) and when the voltage drop is detected, the changeover switch (7) is closed such that the energy storage device (5) is electrically coupled to the consumer (9) thereby supplying the stabilization voltage ($U_{STAB}$) at the at least one voltage-sensitive consumer (9).

19. The method according to claim 11, wherein the energy storage device (5) is chargeable exclusively by the DC/DC converter circuit (3) when the voltage drop is not detected.

20. The method according to claim 11, wherein a control device controls the charging of the energy storage device (5) and the instant of switching of the changeover switch (7).

* * * * *